United States Patent
Kurokawa

(10) Patent No.: US 6,365,865 B1
(45) Date of Patent: Apr. 2, 2002

(54) PROCESS FOR WELDING FIXTURE PIPES TO OPPOSITE ENDS OF HOLLOW STABILIZER'S SUSPENSION ARM FOR VEHICLE

(75) Inventor: Hirotusgu Kurokawa, Aichi-Ken (JP)

(73) Assignee: Chuohatsujo Kabushiki Kaisha (JP)

(*) Notice: Subject to any disclaimer, the term of this patent is extended or adjusted under 35 U.S.C. 154(b) by 0 days.

(21) Appl. No.: 09/325,449

(22) Filed: Jun. 3, 1999

(30) Foreign Application Priority Data

Mar. 26, 1999 (JP) ............................................. 11-083142

(51) Int. Cl.$^7$ ........................... B23K 9/235; B23K 11/00
(52) U.S. Cl. ..................... 219/59.1; 219/61; 219/61.2; 219/67; 228/173.4; 228/175
(58) Field of Search ..................... 219/59.1, 61, 61.2, 219/67, 78.1, 101, 117.1; 228/173.1, 173.4, 173.5, 175

(56) References Cited

U.S. PATENT DOCUMENTS

| | | | | |
|---|---|---|---|---|
| 2,453,061 A | * | 11/1948 | Bissout et al. ............. | 219/59.1 |
| 3,739,134 A | * | 6/1973 | Wade et al. ................. | 219/62 |
| 4,369,349 A | * | 1/1983 | Myhre .................... | 219/121.14 |
| 4,490,092 A | * | 12/1984 | Premont ........................ | 415/1 |
| 4,638,555 A | * | 1/1987 | MacLachlan et al. ....... | 29/623.1 |
| 5,228,195 A | * | 7/1993 | Brown et al. .............. | 29/888.3 |
| 5,507,888 A | * | 4/1996 | Dickson, Jr. et al. ........ | 148/690 |
| 5,562,312 A | * | 10/1996 | Carlin ..................... | 285/288.4 |

FOREIGN PATENT DOCUMENTS

| | | | | |
|---|---|---|---|---|
| JP | 360087970a | * | 5/1985 | ................. 219/59.1 |
| JP | 63183773 | * | 7/1988 | ................. 219/59.1 |
| JP | 401152417 A | * | 6/1989 | ................. 219/59.1 |

* cited by examiner

*Primary Examiner*—Samuel M. Heinrich
(74) *Attorney, Agent, or Firm*—Lackenbach Siegel Marzullo Aronson & Greenspan

(57) ABSTRACT

A welding process in which fixture pipes 3 are resistance welded to opposite ends of a hollow stabilizer's suspension arm 1 for a vehicle and thereafter, these two parts are subjected to arc welding, but with a first step of the ends of the hollow stabilizer's suspension arm upset to form thick wall portions before resistance welding and arc welding are performed. The initial resistance welding retains the two parts in place for the arc welding step.

6 Claims, 4 Drawing Sheets

PROCESS FOR WELDING FIXTURE PIPES TO OPPOSITE ENDS OF HOLLOW STABILIZER'S SUSPENSION ARM FOR VEHICLE

BACKGROUND OF THE INVENTION

1. Field of the Invention

This invention relates to a process for welding a fixture pipe to each end of a stabilizer which serves to alleviate rolling of a vehicle.

2. Description of the Prior Art

To weld fixture pipes to opposite ends of a hollow stabilizer's suspension arm, each end surface of the hollow stabilizer's suspension arm a has conventionally been machined to form a concave b in conformity with an outer peripheral surface of each fixture pipe c, as shown in FIG. 4 of the accompanying drawings. Then, these two parts are rotated with said concave b held against the outer peripheral surface of the fixture pipe c to arc weld these two parts together. In this manner, bead d is formed between the respective outer peripheral surfaces of the hollow stabilizer's suspension arm a and the fixture pipe c as shown in FIG. 5.

However, such conventional welding process has disadvantages lying in that the welding process is inevitably complicated; it is difficult to hold two parts in close surface contact; bead is formed not around the inner peripheral surface but only around the outer peripheral surface of the hollow stabilizer's suspension arm and therefore improvement of a joining effect is limited; during the arc welding, complicated arrangements are necessary to rotate two parts to be welded together as they are held in desired relative position because the hollow stabilizer's suspension arm and the fixture pipe are neither welded nor bonded together prior to the arc welding.

SUMMARY OF THE INVENTION

This invention aims to solve the problems as have been described above.

The object set forth above is achieved, according to the invention, by resistance welding the fixture pipe to each end of the hollow stabilizer's suspension arm and then subjecting the resistance welded zone to arc welding. In this way, none of machining steps is required prior to welding and, in consequence, the welding process is correspondingly simplified. Additionally, the resistance welding ensures the end of the hollow stabilizer's suspension arm to be reliably welded to the fixture pipe not only along the outer peripheral surface but also along the inner peripheral surface of said end. Such double process of resistance welding and arc welding drastically improves a welding effect, on one hand, and simplifies the steps of the process, on the other hand, because the step of arc welding can be performed with the hollow stabilizer's suspension arm and the fixture pipe already joined together by the previous step of resistance welding.

The ends of said hollow stabilizer's suspension arm are subjected to upsetting to form thick-wall portions, respectively, before said steps of resistance welding and arc welding. This advantageously enlarges a sectional area around which the hollow stabilizer's suspension arm should be welded to the fixture pipe and thereby improves a welding effect.

Also, in accordance with the invention, the hollow stabilizer's suspension arm is made of seam welded steel pipe containing, in % by weight C: 0.05~0.07, Si: 0.55~0.65, Mn: 1.90~2.10, P: less than 0.030, S: less than 0.010, Ti: 0.08~0.12, Nb: 0.03~0.05 and Ca: 0.002~0.006. A content of carbon is adequately low to prevent a weld zone from being hardened and becoming brittle due to a welding heat; and The hollow stabilizer's suspension arm has a wall thickness of 1.5~2.5 mm at its tip prior to resistance welding. Such dimensioning ensures an appropriate penetration for reliable welding.

In addition, the arc welding starts from a point on the seam welded steel pipe remote from its seam. By selecting a starting point of the arc welding in this manner, the arc welding can be stabilized on the seam and therefore there is no apprehension that a strength of the seam welded steel pipe might be deteriorated at the seam.

DESCRIPTION OF THE PREFERRED EMBODIMENT

One preferred embodiment of the invention will be described in reference with FIGS. 1~3 of the accompanying drawings.

Figure 3:
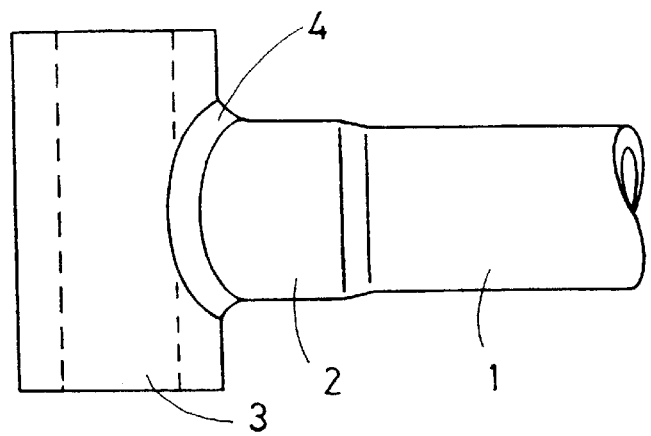
FIG. 3 is a front view of the fixture pipe after being welded to said hollow stabilizer's suspension arm.
Figure 1:
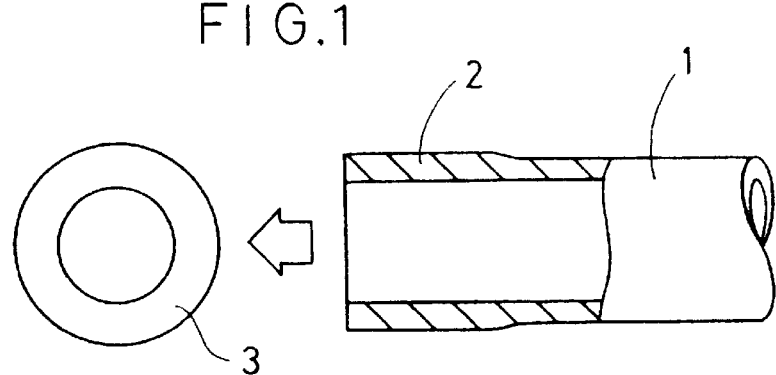
FIG. 1 is a side view showing a fixture pipe ready to be welded to an end of a hollow stabilizer's suspension arm using a process according to one preferred embodiment of the invention as partially broken away.
Figure 2:
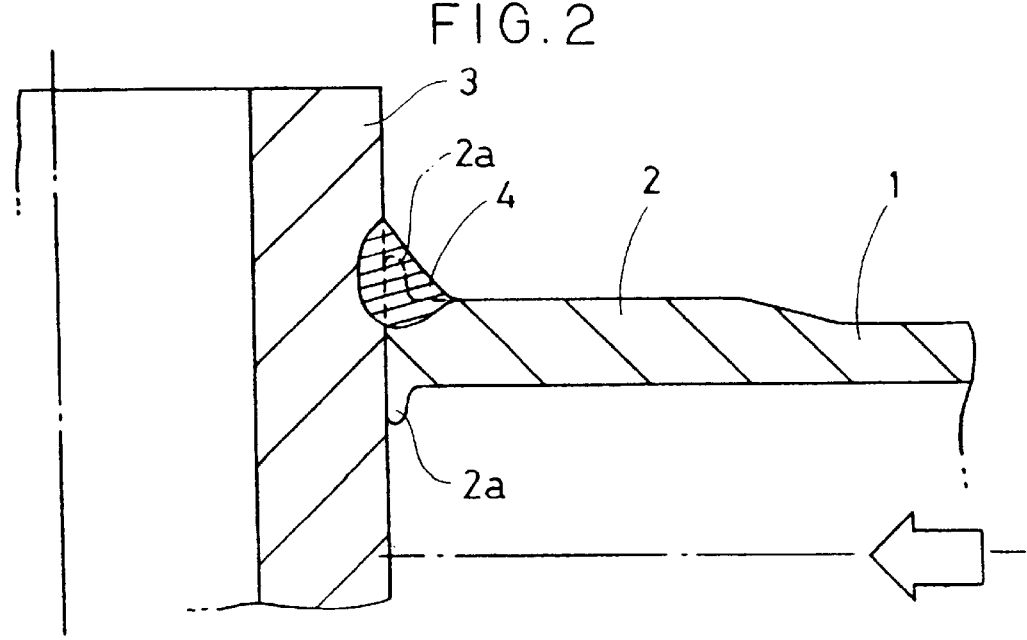
FIG. 2 is an enlarged sectional view of a weld zone.
Figure 4:
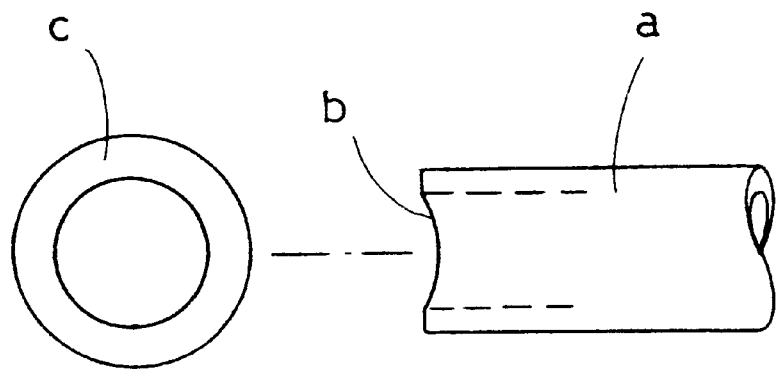
FIG. 4 is a view similar to FIG. 1 but relating to the case of prior art.
Figure 5:
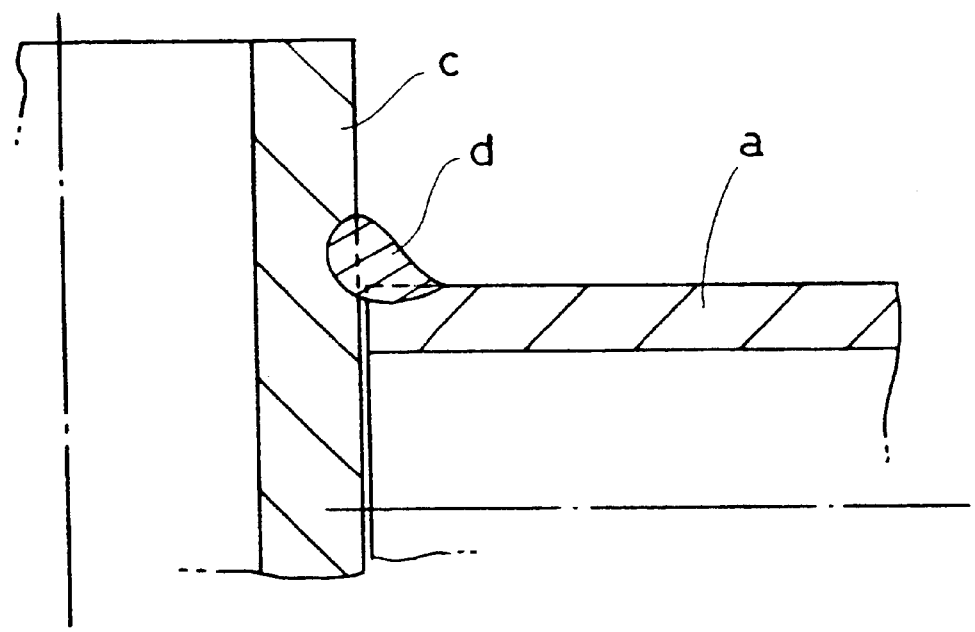
FIG. 5 is a view similar to FIG. 2 but relating to the case of prior art.

Referring to FIGS. 1~3, reference numeral 1 designates a hollow stabilizer's suspension arm provided at its ends with thick-wall portions 2, respectively, formed by so-called upsetting process.

Reference numeral 3 designates a fixture pipe. A high voltage is applied to the hollow stabilizer's suspension arm 1 being pressed against an outer peripheral surface of said fixture pipe 3 in a direction orthogonal thereto as shown in FIG. 1. Thereupon, a current flowing along an interface of these two parts generates Joule heat which softens the end of the hollow stabilizer's suspension arm 1. Consequently, the softened end is forced to swell out onto inner and outer peripheral surfaces of said end so that the hollow stabilizer's suspension arm 1 is welded, together with such swelling out portion 2a, to the fixture pipe 3, as shown in FIG. 2.

Now around the welded zone thus formed between the stabilizer's suspension arm 1 and the fixture pipe 3, an arc welding is carried out to form a bead 4 as shown in FIGS. 2 and 3.

As will be apparent from the foregoing description, the welding process according to this invention is characterized by that the hollow stabilizer's suspension arm 1 is pressed against and resistance welded to the outer peripheral surface of the fixture pipe 3 prior to the arc welding. In this way, none of machining steps is required and the welding process is correspondingly simplified. In addition, the resistance welding ensures the end of the hollow stabilizer's suspension arm to be reliably welded to the fixture pipe 3 not only along the outer peripheral surface but also along the inner peripheral surface of said end. Such double process of resistance welding and arc welding drastically improves a joining effect, on one hand, and simplifies the steps of the process, on the other hand, since the step of arc welding can be performed with the hollow stabilizer's suspension arm 1 and the fixture pipe 3 already joined together by the previous step of resistance welding. Furthermore, before subjected to the welding process, the opposite ends of the hollow stabilizer's suspension arm 1 have been subjected to the upsetting process to form the thick wall portions 2. This advantageously enlarges a sectional area around which the hollow stabilizer's suspension arm 1 should be welded to the fixture pipe 3 and thereby improves a joining strength.

Figure 6:
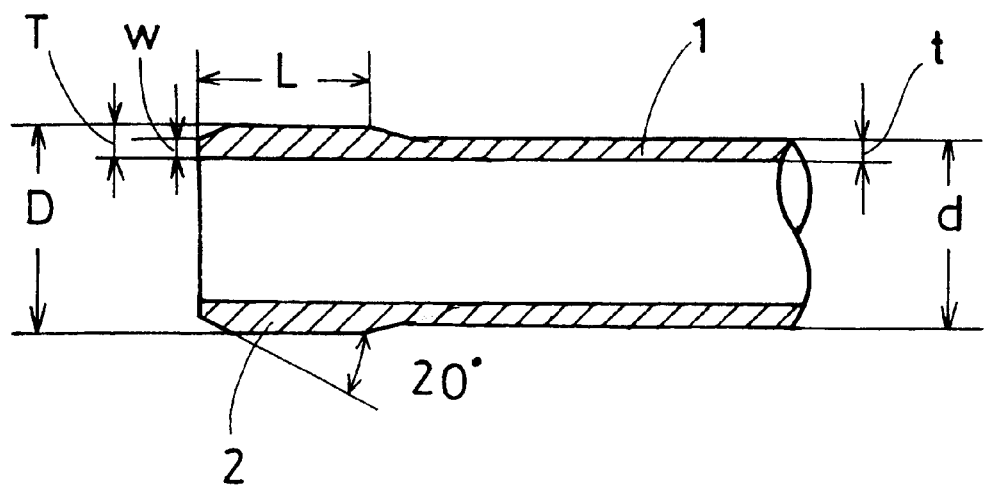
FIG. 6 is an axial sectional view showing an end of the stabilizer's suspension arm.
Figure 7:
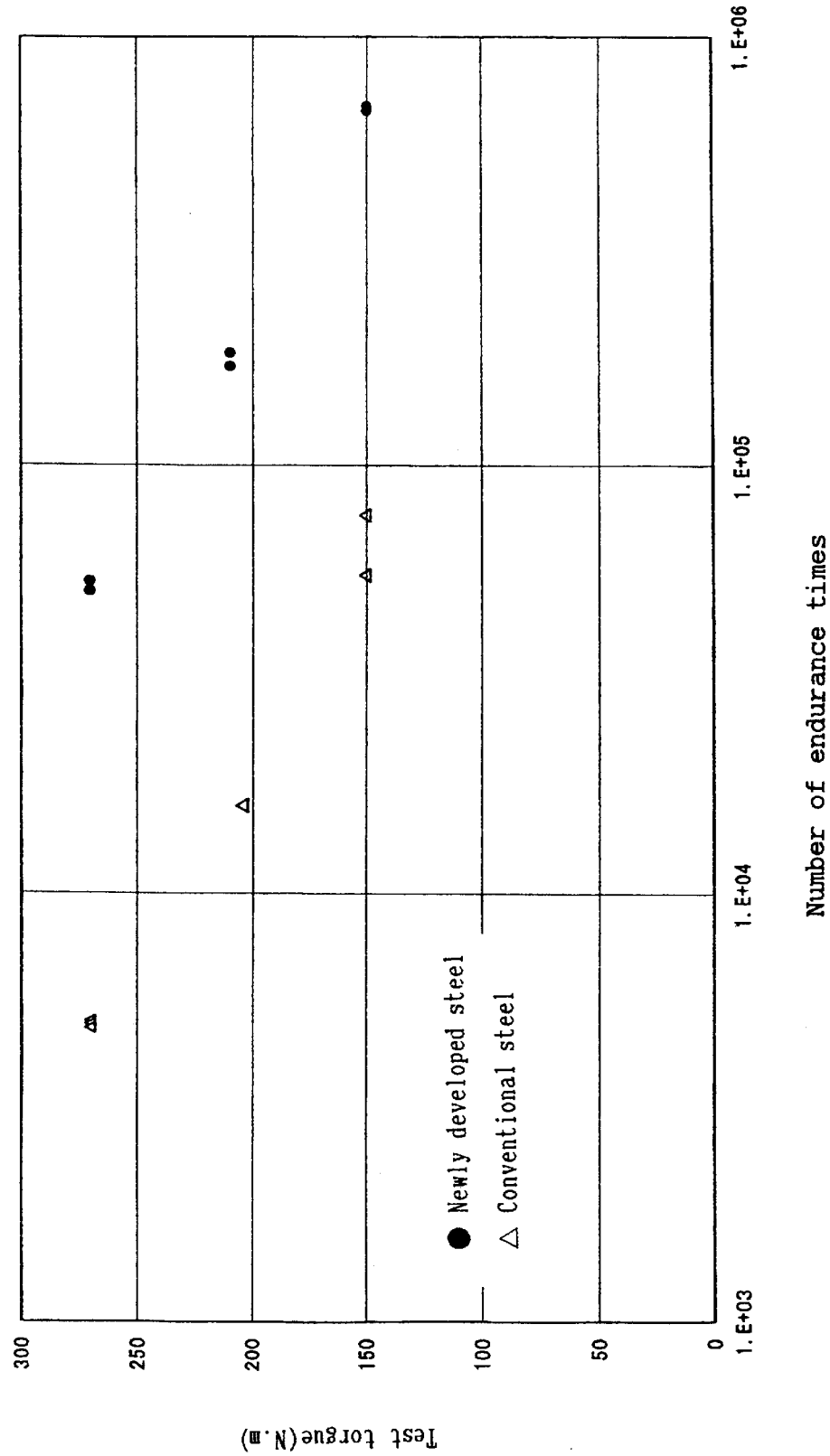
FIG. 7 is a graphic diagram indicating a result of endurance test conducted for the stabilizer.

FIG. 6 is an axial sectional view showing a specific example of the stabilizer's suspension arm having an entire length of 890 mm as partially taken along its portion adjacent one end thereof. Referring to FIG. 6, d: 21 mm, t: 2.6 mm, D: 23.2 mm, T: 3.5 mm, 2: 2.0 mm, and L: 20.5 mm. With the fixture pipe 3 made of JIS specified steel STKM11A having an outer diameter of 25 mm and an inner diameter of 16 mm being joined to each end of the stabilizer's suspension arm 1 by resistance welding and arc welding, a series of endurance tests were comparatively conducted; on a stabilizer's suspension arm made of conventional seam welded steel pipe which contains, in % by weight, C: 0.2~0.25, Si: 0.10~0.25, Mn: 0.30~0.60, P: less than 0.030, S: less than 0.030, Cr: 0.20~0.40, and B: 0.001~0.005 and on a stabilizer's suspension arm made of a newly developed seam welded steel pipe which contains, also in % by weight, C: 0.05~0.07, Si: 0.55~0.65, Mx: 1.90~2.10, P: less than 0.030, S: less than 0.010, Ti: 0.08~0.12, Nb: 0.03~0.05 and Ca: 0.002~0.006. Result of these tests as indicated in FIG. 7 demonstrates the superiority of the newly developed seam welded steel pipe.

Tests of endurance against a torsion angle of ±10° were also conducted on the stabilizer's suspension arm to which the fixture pipe had been joined only by the resistance welding. For these tests, the dimensional values except w were kept as given above and only w was varied. Result of the tests demonstrated that the stabilizer's suspension arm having the value w of 2.0 mm offers the highest endurance and those having the value w in a range of 1.5~2.5 mm are useful.

While the opposite ends of the stabilizer's suspension arm are tapered by 20° to regulate the dimension w in this embodiment, it is also possible to select a taper angle depending on the inner and outer diameters of the stabilizer's suspension arm.

It has been found from tests that a weld strength can be improved by start the arc welding at a point on the seam welded steel pipe which is remote from the seam.

What is claimed is:

1. Process for welding fixture pipes to opposite ends of a hollow stabilizer's suspension arm for a vehicle, substantially in a direction orthogonal thereto, comprising the steps of:

upsetting the ends of said hollow stabilizer's suspension arm to form thick-wall portions, respectively;

resistance welding said fixture pipe to each end of said hollow stabilizer's suspension arm to form resistance welded zones; and subjecting the resistance welded zones to arc welding.

2. The process according to claim 1, wherein said thick wall portion has a wall thickness of about 1.5 mm to about 2.5 mm.

3. The process according to claim 1 wherein said hollow stabilizer suspension arm has a welded seam, and wherein said arc welding starts from a point remote from said welded seam.

4. A process for making a stabilizer suspension arm for use in stabilizing a vehicle, comprising the steps of:

providing an elongated, hollow stabilizer suspension arm for use in stabilizing a vehicle, said hollow stabilizer suspension arm having an end portion terminated at a planar edge;

upsetting the end portion of said hollow stabilizer suspension arm to form a thick wall end portion terminated at a thick wall planar edge;

tapering said thick wall edge to form a thick wall end portion terminated at a tapered planar edge;

providing a rounded fixture pipe having an outer surface;

resistance welding said outer surface of said fixture pipe to said tapered edge of said tapered thick wall end portion to form a resistance welded zone, whereby said fixture pipe is in an orthogonal orientation to said hollow stabilizer suspension arm;

arc welding said resistance welded zone to form a double welded joint; and wherein said hollow stabilizer suspension arm is made of steel containing, in % by weight, C: 0.05~0.07, Si: 0.55~0.65, Mn: 1.90~2.10, P: less than 0.030, S: less than 0.010, Ti: 0.08~0.12, Nb: 0.03~0.05, and Ca: 0.002~0.006.

5. The process according to claim 4, wherein said thick wall portion has a wall thickness of about 1.5 mm to about 2.5 mm.

6. The process according to claim 4, wherein said hollow stabilizer suspension arm has a welded seam, and wherein said arc welding starts from a point remote from said welded seam.

* * * * *